United States Patent
Okamoto

(10) Patent No.: US 12,493,980 B2
(45) Date of Patent: Dec. 9, 2025

(54) IMAGE PROCESSING DEVICE AND IMAGE PROCESSING METHOD

(71) Applicant: Nissan Motor Co., Ltd., Yokohama (JP)

(72) Inventor: Masaki Okamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/693,557

(22) PCT Filed: Oct. 8, 2021

(86) PCT No.: PCT/JP2021/037332
§ 371 (c)(1),
(2) Date: Mar. 20, 2024

(87) PCT Pub. No.: WO2023/058221
PCT Pub. Date: Apr. 13, 2023

(65) Prior Publication Data
US 2024/0386601 A1    Nov. 21, 2024

(51) Int. Cl.
*G06T 7/73* (2017.01)
*G06T 7/20* (2017.01)
(Continued)

(52) U.S. Cl.
CPC ............... *G06T 7/73* (2017.01); *G06T 7/20* (2013.01); *G06V 40/10* (2022.01); *G06V 40/20* (2022.01);
(Continued)

(58) Field of Classification Search
CPC ... G06T 7/73; G06T 7/20; G06T 2207/20081; G06T 2207/30196; G06T 2207/30244; G06V 40/10; G06V 40/20
See application file for complete search history.

(56) References Cited

U.S. PATENT DOCUMENTS 10,679,044 B2*  6/2020  Vaezi Joze ............. G06V 10/82
2021/0051266 A1*  2/2021  Matsuo ................. H04N 23/672
(Continued)

FOREIGN PATENT DOCUMENTS

CN   101390406 A   3/2009
CN   103302663 A   9/2013
(Continued)

OTHER PUBLICATIONS

Watanabe et al., "Human Gait Estimation Using a Wearable Camera", 2011 IEEE Workshop on Applications of Computer Vision (WACV) (Year: 2011).*
(Continued)

*Primary Examiner* — Qian Yang
(74) *Attorney, Agent, or Firm* — GLOBAL IP COUNSELORS, LLP

(57) ABSTRACT

An image processing device includes an acquisition unit, a detection unit, a calculation unit and a correction unit. The acquisition unit is configured to acquire an image including a person from an imaging device mounted on at least either one of the person or an article carried by the person. The detection unit is configured to detect an orientation of the person from the image. The calculation unit is configured to calculate a positional offset of the imaging device from the image using a reference position that serves as a reference for calculating the positional offset. The correction unit is configured to correct the orientation using the positional offset.

8 Claims, 12 Drawing Sheets

(51) Int. Cl.
*G06V 40/10* (2022.01)
*G06V 40/20* (2022.01)

(52) U.S. Cl.
CPC .............. *G06T 2207/20081* (2013.01); *G06T 2207/30196* (2013.01); *G06T 2207/30244* (2013.01)

(56) References Cited

U.S. PATENT DOCUMENTS

2021/0192783 A1* 6/2021 Huelsdunk ................ G06T 7/75
2022/0233253 A1* 7/2022 Shelton, VI ........... G16H 40/20

FOREIGN PATENT DOCUMENTS

| CN | 105688396 | A | | 6/2016 |
| CN | 106104196 | A | | 11/2016 |
| CN | 112109075 | A | | 12/2020 |
| CN | 112712545 | | * | 4/2021 |
| JP | 2016-99982 | A | | 5/2016 |
| JP | 2018-81008 | | * | 5/2018 |

OTHER PUBLICATIONS

Machine translation for JP 2018-81008 (Year: 2018).*
Machine translation for CN 112712545 (Year: 2021).*
Hatanaka et al., A Method of Human Gait Estimation Using a Wearable Camera, Proceedings of the 2009 JSME Conference on Robotics and Mechatronics, May 24, 2009, pp. 1-4, Section "3. Experiment", The Japan Society of Mechanical Engineers, Fukuoka, Japan.
Koike et al., Motion Capture Technique Using a Single Chest-Mounted Miniature Camera, Tokyo Institute of Technology Press Release, Oct. 21, 2020, pp. 1-5, Section "Research Results", Tokyo Institute of Technology and Japan Science and Technology Agency, Tokyo, Japan.
Chinese Office Action of Aug. 1, 2024 of corresponding Chinese Patent Application No. 202180103139.7.
Tekin et al., "H+O: Unified Egocentric Recognition of 3D Hand-Object Poses and Interactions", 2019 IEEE/CVF Conference on Computer Vision and Pattern Recognition (CVPR), Jun. 15, 2019, pp. 4506-4515, IEEE, New York.
Garcia-Hernando et al., "First-Person Hand Action Benchmark with RGB-D Videos and 3D Hand Pose Annotations", 2018 IEEE/CVF Conference on Computer Vision and Pattern Recognition, Jun. 18, 2018, pp. 409-419, IEEE, New York.
Xu et al., "Mo2Cap2: Real-time Mobile 3D Motion Capture with a Cap-mounted Fisheye Camera", IEEE Transactions on Visualization and Computer Graphics, May 2019, pp. 2093-2101, vol. 25, No. 5, IEEE, New York.
Extended European Search Report of Oct. 9, 2024 of corresponding European Patent Application No. 21959963.6.
Chinese Office Action of Oct. 24, 2024 of corresponding Chinese Patent Application No. 202180103139.7.
Communication pursuant to Article 94(3) EPC received for European Application No. 21959963.6, mailed on Apr. 10, 2025, 6 pages.
Taehee Lee et al., "Handy AR: Markerless Inspection of Augmented Reality Objects Using Fingertip Tracking", 2007 11th IEEE International Symposium on Wearable Computers, IEEE, Oct. 11, 2007, 8 pages.

* cited by examiner

IMAGE PROCESSING DEVICE AND IMAGE PROCESSING METHOD

CROSS-REFERENCE TO RELATED APPLICATIONS

This application is a U.S. national stage application of International Application No. PCT/JP2021/037332, filed on Oct. 8, 2021.

BACKGROUND

Technical Field

The present invention relates to an image processing device and an image processing method for recognizing an action of a person.

Background Information

A method is known in which: three-dimensional image data and two-dimensional image data forming a pair are acquired, the pair of data being captured by a camera from an imager side; a position and an orientation of a camera are estimated on the basis of the three-dimensional image data; a skeleton orientation parameter representing an orientation of the skeleton of the imager is acquired on the basis of the estimated position and orientation of the camera, a body type parameter representing a body type of the imager that is derived in advance, and the three-dimensional image data; an orientation feature amount pertaining to the imager is extracted on the basis of the skeleton orientation parameter; an image feature amount is extracted on the basis of the two-dimensional image data; and an action of the imager is recognized on the basis of the orientation feature amount, the image feature amount, and an identification instrument parameter that is learned in advance and is for identifying the action of the imager (Japanese Laid-Open Patent Application No. 2016-99982—Patent Document 1).

SUMMARY

However, in the prior art described above, a problem is presented in that, if a mounting position of a camera mounted on the head or another portion of a person is offset from an initial position, then an orientation of the person cannot be correctly recognized using image data acquired by the camera.

The problem to be solved by the present invention is to provide an image processing device and an image processing method that make it possible to correctly recognize an orientation of a person even if a mounting position of a camera is offset.

The present invention solves the aforementioned problem by: acquiring an image including a person from an imaging device mounted on at least either one of the person or an article carried by the person; detecting an orientation of the person from the image; calculating a positional offset of the imaging device, from the image, using a reference position that serves as a reference for calculating the positional offset; and correcting the orientation using the positional offset.

The present invention makes it possible to correctly recognize an orientation of a person even if a mounting position of a camera is offset.

BRIEF DESCRIPTION OF THE DRAWINGS

Referring now to the attached drawings which form a part of this original disclosure.

PREFERRED EMBODIMENTS OF THE INVENTION

A preferred embodiment of the image processing device and image processing method according to the present invention is described below on the basis of the drawings.

Figure 1:
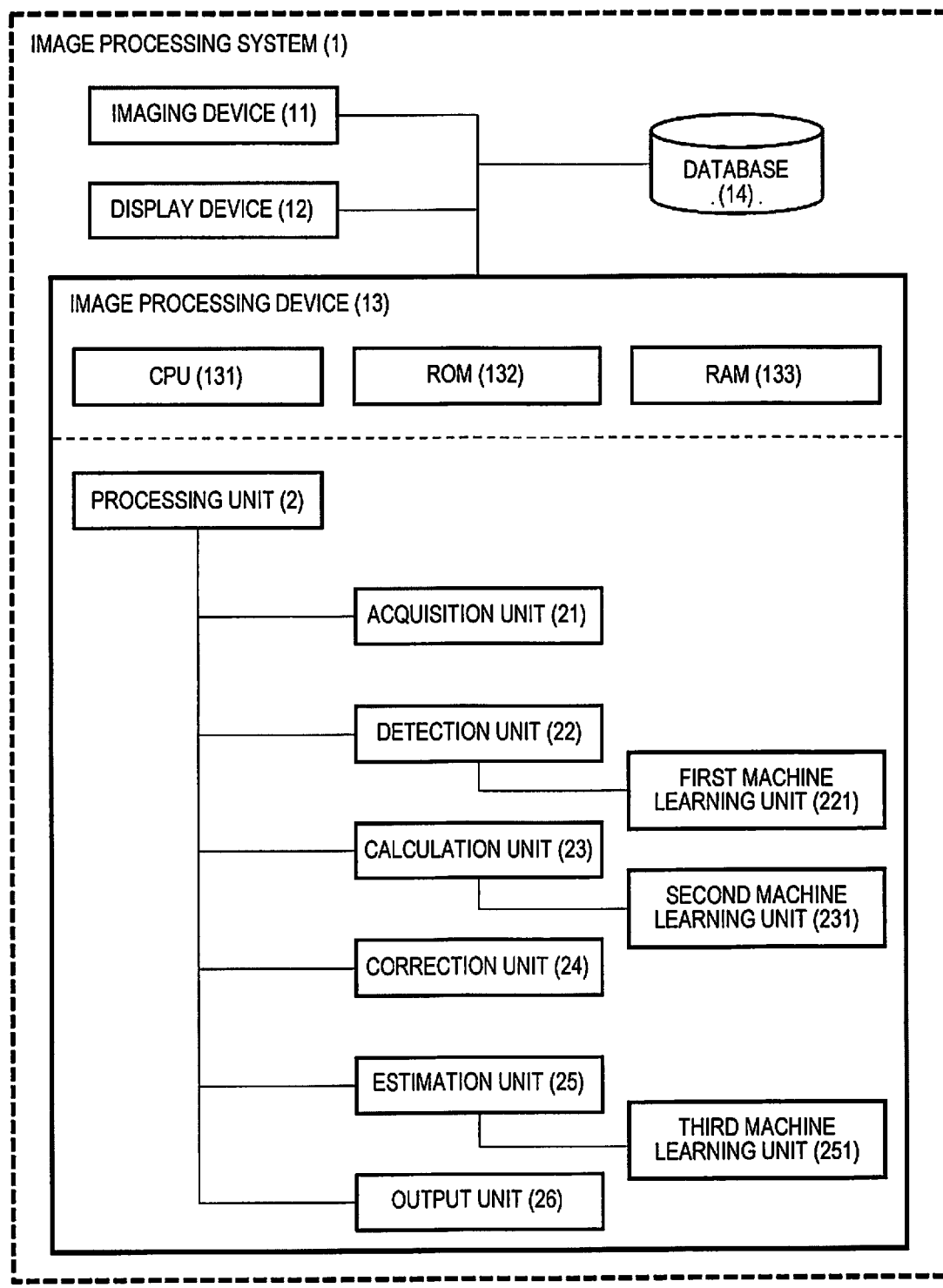
FIG. 1 is a block diagram showing one embodiment of an image processing system that includes an image processing device according to the present invention.

FIG. 1 is a block diagram showing an image processing system 1 according to the present invention. The image processing system 1 is an apparatus that detects an action of an operator who performs a prescribed operation (corresponding to the person according to the present invention). The prescribed operation is not particularly limited; examples include operations performed on onboard equipment by a passenger in a vehicle (including a driver; the same applies below), operations performed on a tool by a worker who engages in assembly work in a factory, and operations performed on a maintenance instrument by a mechanic who engages in vehicle maintenance in a vehicle sales shop (hereinafter referred to as a "dealer"). The operator whose action is detected by the image processing system 1 (hereinafter referred to as the "operator") is not particularly limited; examples include vehicle passengers, factory workers, and dealer mechanics. Examples of the action detected by the image processing system 1 include actions in which a vehicle passenger reaches out a hand to a switch on an air conditioner or other onboard equipment in order to operate the onboard equipment, actions in which a worker in an assembly factory retrieves a torque wrench from a toolbox, and actions in which a mechanic at a dealer touches a switch for raising or lowering a lift on which a vehicle is elevated. Detecting an action such as those described above using the image processing system 1 of the present embodiment makes it possible to confirm whether a function associated with operation of onboard equipment is suitably realized, whether assembly work by a worker who engages in the assembly work is being performed in accordance with a predetermined procedure in a vehicle assembly factory, or whether maintenance by a mechanic who engages in vehicle maintenance is being performed in accordance with a manual at a vehicle dealer.

As shown in FIG. 1, the image processing system 1 comprises an imaging device 11, a display device 12, and an image processing device 13. Equipment constituting the image processing system 1 is connected, in a state in which data can be transferred back and forth, by a well-known means such as a wired or wireless LAN. The number of imaging devices 11 and display devices 12 is not particularly limited, provided that at least one or more of each of these devices is present. The imaging device 11 and the display device 12 do not need to be provided together with the image processing device 13, but rather may be installed at a location set apart from the image processing device 13. For example, the imaging device 11 and the display device 12 may be installed near an assembly line in an assembly factory, and the image processing device 13 may be provided to a central control room that is set apart from the assembly line or to a remote server that is set apart from the assembly factory.

The imaging device 11 is for acquiring image data pertaining to subjects present around the operator; for example, the imaging device 11 is a camera provided with a CCD or another imaging element, an ultrasound camera, an infrared camera, or another type of camera. The subjects include, in addition to the operator, objects that are present around the operator. For example, the subjects include switches or panels in the surroundings of a vehicle passenger, parts being assembled or tools being used by a worker, or a vehicle on which a mechanic at a dealer is performing maintenance. The imaging device 11 is installed at a position from which it is possible to detect an orientation of the body of the operator, such as: in a dashboard, roof, or seat of a vehicle; near an assembly line, a workbench, or an implement used by a worker in an assembly factory; or in a lift at a dealer.

The imaging device 11 in the present embodiment is mounted on at least either one of the operator who is performing the prescribed operation described above or an article carried by the operator. In such instances, the imaging device 11 is attached such that at least part of the body of the operator can be imaged. In cases where the imaging device 11 is mounted on the operator, the imaging device 11 is mounted on, e.g., the head, upper arm, forearm, stomach, thigh, or lower leg of the operator. Mounting methods include winding the imaging device 11 around the body of the operator and fixing the imaging device 11 thereto using a hook-and-loop fastener or a buckle, affixing the imaging device 11 to the body of the operator using a sticky tape, and bonding the imaging device 11 to the body of the operator using an adhesive agent.

Figure 2A:
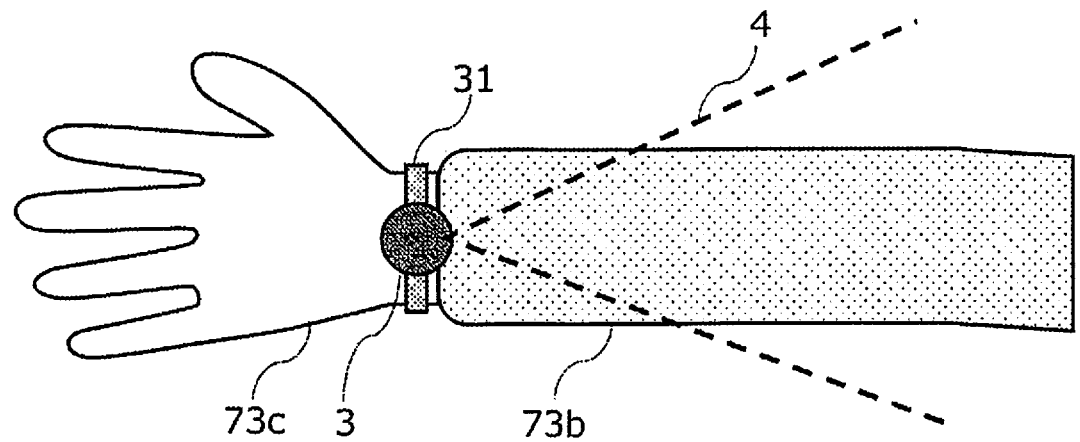
FIG. 2A is a plan view showing a wearable terminal provided with the imaging device in FIG. 1, as well as the left-arm forearm and left hand of an operator.

As one example, in cases where the imaging device 11, the display device 12, and the image processing device 13 are integrated into one wearable terminal 3 such as a smartwatch, the wearable terminal 3 is mounted as shown in FIG. 2A. FIG. 2A is a plan view showing the left-arm forearm 73b and the left hand 73c of an operator, the left-arm forearm 73b being covered by clothing. In such cases, the wearable terminal 3 is mounted by being wound around a portion of the left-arm forearm 73b of the operator that is near the wrist by using a band 31 provided with a hook-and-loop fastener. The wearable terminal 3 is provided with the imaging device 11, and the imaging device 11 captures an image having a range of a field of view 4 indicated by dashed lines in FIG. 2A. This makes it possible to capture an image including the body of the operator on whom the wearable terminal 3 is mounted.

The article carried by the operator is clothing, protective gear, or the like that the operator wears while performing the prescribed operation. Examples of the clothing or protective gear include: a jacket, a coat, a wristwatch, a ring, an earring, or a piercing carried by a vehicle passenger; and work clothes, headgear, safety boots, a helmet, a mask, or protective goggles carried by a worker in an assembly factory or a mechanic at a dealer. Examples of methods for mounting the imaging device 11 on the clothing or protective gear worn by the operator include: fixing the imaging device 11 to a coat or work clothes using a hook-and-loop fastener; methods for attaching a member such as a clamp to headgear, a helmet, a mask, or protective goggles and then gripping the imaging device 11 using the member to mount the imaging device 11; and bonding the imaging device 11 to a wristwatch or safety boots using a sticky tape or an adhesive agent.

Figure 2B:
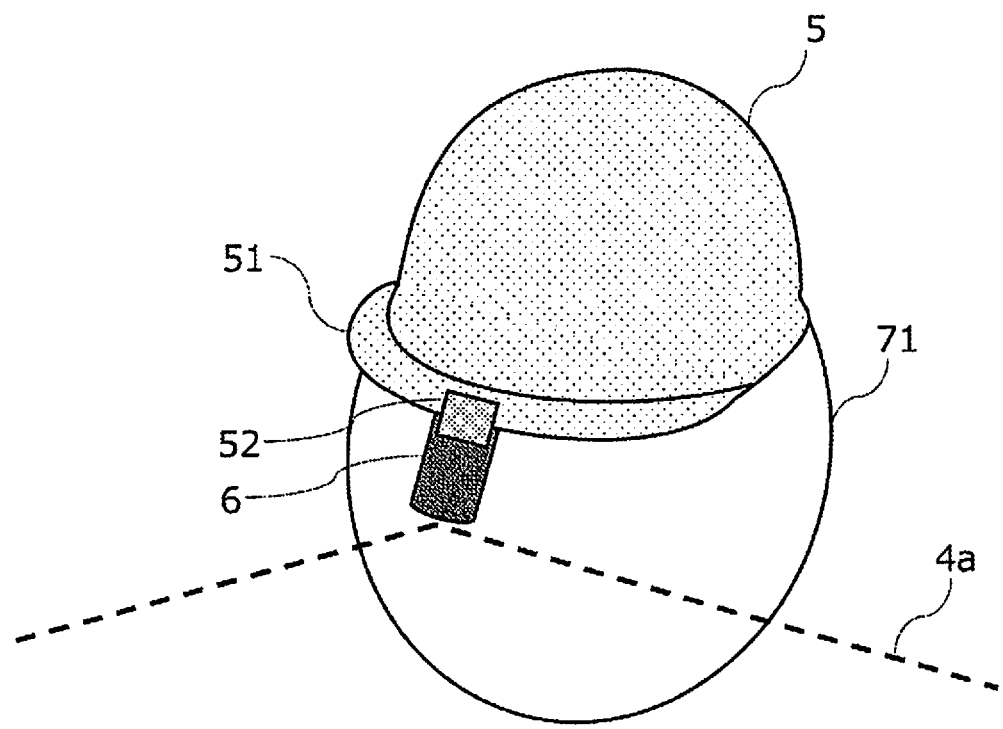
FIG. 2B is a perspective view showing the head of a person (the operator) and a helmet to which is attached a camera that is the imaging device in FIG. 1.

As one example, in cases where the imaging device 11 is a CCD camera provided with a wide-angle lens, a fish-eye lens, or an ultrawide-angle lens, the imaging device 11 is mounted as shown in FIG. 2B. FIG. 2B is a perspective view showing the head 71 of the operator and a helmet 5 mounted on the head 71. In such cases, a camera 6 is attached facing downward, such that the body of the operator can be imaged, to a brim 51 of the helmet 5 worn by the operator. A method for attaching the camera 6 includes attaching a bracket 52 for holding the camera 6 to the helmet 5 and holding the camera 6 by using the bracket 52. Alternatively, the method may include providing a portion for gripping the camera 6 to the helmet 5, integrally molding the aforementioned portion with the helmet 5, and gripping the camera 6. The camera 6 captures an image of a range of a field of view 4a indicated by dashed lines in FIG. 2B. This makes it possible to capture an image including the body of the operator on whom the helmet 5 is mounted.

Figure 2C:
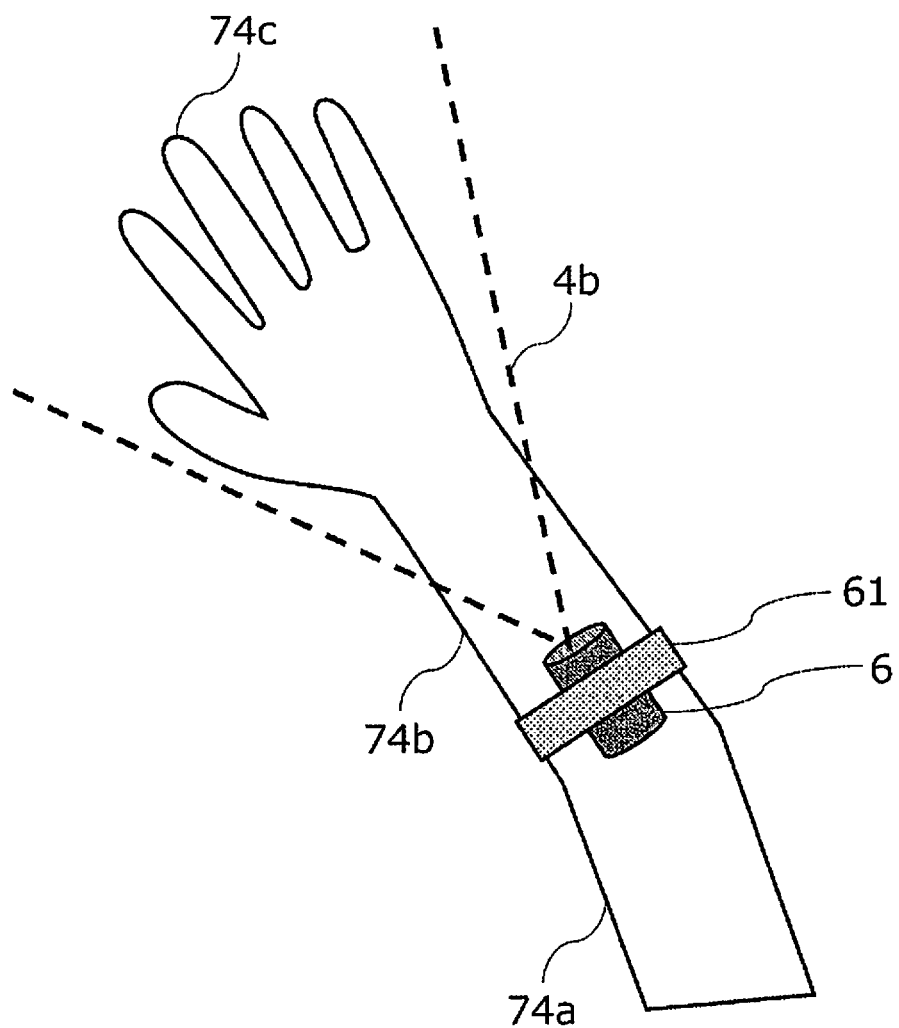
FIG. 2C is a plan view showing the camera that is the imaging device in FIG. 1 and the right arm of the operator.

In cases where the camera 6 is mounted on the operator, the camera 6 is mounted as shown in, e.g., FIG. 2C. FIG. 2C is a plan view showing the right arm of the operator, the right arm being composed of the right-arm upper arm 74a, the right-arm forearm 74b, and the right hand 74c. In such cases, the camera 6 is mounted by being wound around a portion of the right-arm forearm 74b of the operator that is near the elbow by using a band 61 provided with a hook-and-loop fastener. The camera 6 captures an image of a range of a field of view 4b indicated by dashed lines in FIG. 2C. This makes it possible to capture an image including the right hand 74c of the operator on whom the camera 6 is mounted. In FIG. 2C, the camera 6 is mounted so as to be capable of imaging the back-of-hand side of the right hand 74c of the operator, but it is also permissible for the camera 6 to be mounted so as to be capable of imaging the palm side of the right hand 74c of the operator. The matter of which side to image is selected, as appropriate, according to the detected action of the operator. In the example shown in FIG. 2A, the wearable terminal 3 is mounted on the left arm, and in the example shown in FIG. 2C, the camera 6 is mounted on the right arm, but both the wearable terminal 3 and the camera 6 may be mounted on either arm. These mounting positions can be set to appropriate positions within a range in which the action of the operator can be suitably detected.

In FIG. 1, the display device 12 is for notifying the operator regarding the action detected by the image processing device 13. The display device 12 may be, e.g., a liquid crystal display or a projector, and may also be provided with a speaker. The display device 12 is installed in the dashboard of the vehicle, at a workstation of the worker in the assembly factory, or at another position that is near the operator and that makes it possible to notify the operator regarding necessary information. However, in cases where a supervisor who supervises the operation of the operator is present, the display device 12 is installed near the supervisor. In such cases, if the supervisor is at a location set apart from the operator, then the display device 12 is installed at a position set apart from the operator. The display device 12 may also be attached to the operator in the form of a glasses-type wearable terminal. It is furthermore permissible to employ only a speaker that emits a warning sound in accordance with the detected action, in lieu of the display device 12.

The image processing device 13 is for estimating the action of the operator performing the prescribed operation from the orientation of the operator. The image processing device 13 is, e.g., a computer. In particular, when the orientation of the operator is detected, the image processing device 13 can account for positional offset of the imaging device 11. The image processing device 13 cooperates with the imaging device 11 and the display device 12 to thereby acquire image data from the imaging device 11 at prescribed temporal intervals, and then processes the acquired image data to thereby detect the orientation of the operator, correct positional offset of the imaging device 11, and estimate the action of the operator.

In order to realize these functions, i.e., a data acquisition function, an orientation detection function, a positional offset correction function, and an action estimation function, the image processing device 13 is provided with: a central processing unit (CPU) 131, which is a processor; a read-only memory (ROM) 132 in which a program is saved; and a random access memory (RAM) 133, which functions as an accessible storage device. The CPU 131 is an operating circuit for executing the program saved in the ROM 132 to thereby function as the image processing device 13. The image processing device 13 does not need to be provided together with the imaging device 11 and the display device 12 and may instead be provided to a remote server that is set apart from these items of equipment.

The program used by the image processing device 13 includes a processing unit 2 that is a function block for realizing the aforementioned functions of the image processing device 13. The processing unit 2 controls the imaging device 11 and the display device 12 to cause these devices to cooperate, thereby realizing a function (data acquisition function) for acquiring image data that includes the operator from the imaging device 11, functions (orientation detection function and positional offset function) for processing the acquired image data and correcting positional offset of the imaging device 11 before detecting the orientation of the operator, and a function (action estimation function) for estimating the action of the operator from the orientation of the operator. As shown in FIG. 1, the processing unit 2 is provided with an acquisition unit 21, a detection unit 22, a calculation unit 23, a correction unit 24, an estimation unit 25, and an output unit 26 as function blocks that correspond to these functions. FIG. 1 shows these units separately for the sake of convenience.

The image processing device 13 shown in FIG. 1 is provided with all of the aforementioned function blocks, but it is not necessary for a single image processing device 13 to be provided with all of the function blocks; some of the function blocks may be provided to other equipment included in the image processing system 1 or to a separate information processing device (not shown). For example, the detection unit 22 may be provided to the imaging device 11 in the image processing system 1 shown in FIG. 1. In such cases, the function of the detection unit 22 is executed using a CPU, a ROM, and a RAM of the imaging device 11.

Additionally, it is not necessary to execute all of the processes of the function blocks using a single device; the functions of the function blocks may be realized across a plurality of devices that are connected in a state that enables data to be transferred back and forth. For example, in the image processing system 1 shown in FIG. 1, part of the process executed by the calculation unit 23 may be executed by the imaging device 11, and the remainder of the aforementioned process may be executed by the image processing device 13. In such cases, part of the process for realizing the function of the calculation unit 23 is performed using the CPU, the ROM, and the RAM of the imaging device 11.

The functions realized by the function blocks in the processing unit 2 are described below.

The acquisition unit 21 has a function for acquiring an image including the operator from the imaging device 11. Because the imaging device 11 in the present embodiment is installed at a position and direction at which the image including the body of the operator can be captured, as shown in FIGS. 2A to 2C, the acquisition unit 21 can acquire the image including the operator by acquiring the image data captured by the imaging device 11 at prescribed temporal intervals. The image data acquired by the acquisition unit 21 is not limited to still images, but rather may be time-series images, such as in a video. Examples of the images acquired by the acquisition unit 21 are shown in FIGS. 3A to 3C.

Figure 3A:
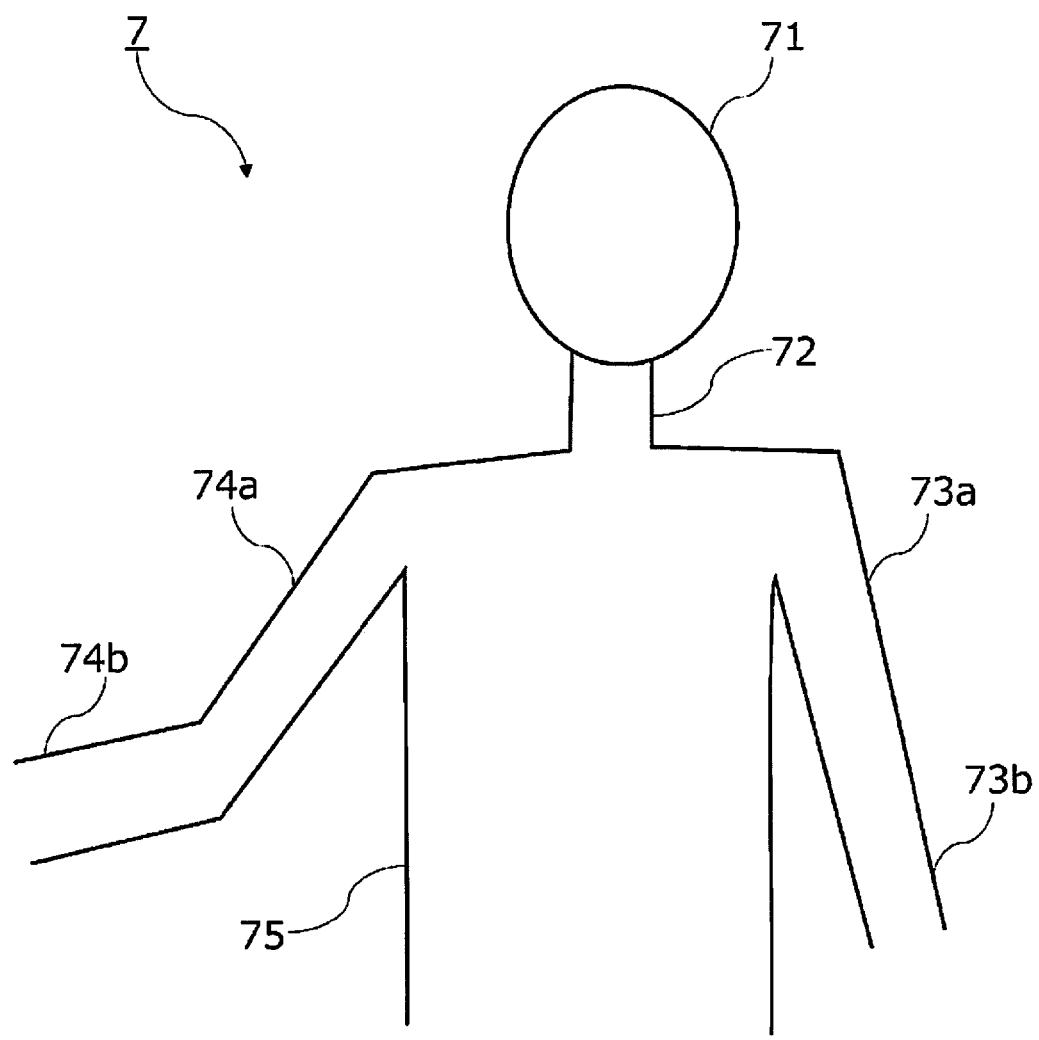
FIG. 3A is a diagram showing one example of an image of the operator that is captured by the wearable terminal in FIG. 2A.

FIG. 3A is an image captured by the wearable terminal 3 shown in FIG. 2A, the image including an operator 7 who is a passenger in a vehicle. The wearable terminal 3 is mounted on the left-arm forearm 73*b* of the operator 7 who is a passenger in a vehicle; therefore, when the operator 7 is imaged from the wearable terminal 3, the left-arm upper arm 73*a* and the left-arm forearm 73*b* appear on the right side, and the right-arm upper arm 74*a* and the right-arm forearm 74*b* appear on the left side, as shown in FIG. 3A. The entirety of the head 71 and neck 72 of the operator 7 is imaged, and part of the torso 75 of the operator 7 is also imaged.

Figure 3B:
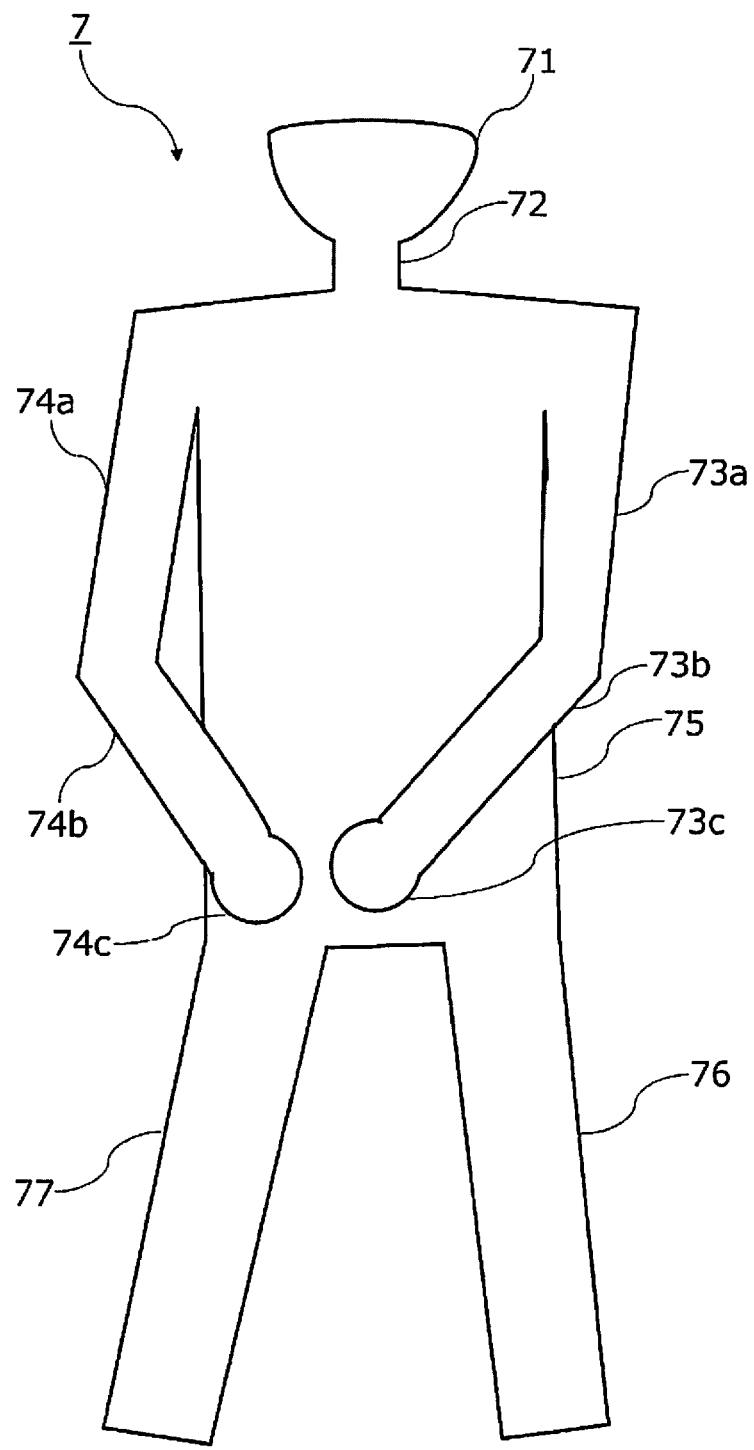
FIG. 3B is a diagram showing one example of an image of the operator that is captured by the camera in FIG. 2B.

FIG. 3B is an image captured by the camera 6 shown in FIG. 2B, the image including an operator 7 who is a worker in a vehicle assembly factory. The camera 6 is mounted facing downward on the brim 51 of the helmet 5 worn on the head 71 of the operator 7 who is a worker; therefore, when the operator 7 is imaged from the camera 6, a portion of the head 71 of the operator 7 that is higher than the brim 51 (i.e., a portion covered by the helmet 5) cannot be imaged. Therefore, an image cannot be acquired for the upper-side portion of the head 71, as shown in FIG. 3B. The neck 72 and torso 75 appear below the head 71; the right-arm upper arm 74*a*, the right-arm forearm 74*b*, and the right hand 74*c* appear on the left side of the torso 75; and the left-arm upper arm 73*a*, the left-arm forearm 73*b*, and the left hand 73*c* appear on the right side of the torso 75. Because the camera 6 images the operator 7 from in front of the operator 7, left and right are reversed in the same manner as in FIG. 3A. Additionally, part of the left leg 76 and part of the right leg 77 are imaged below the torso 75.

Figure 3C:
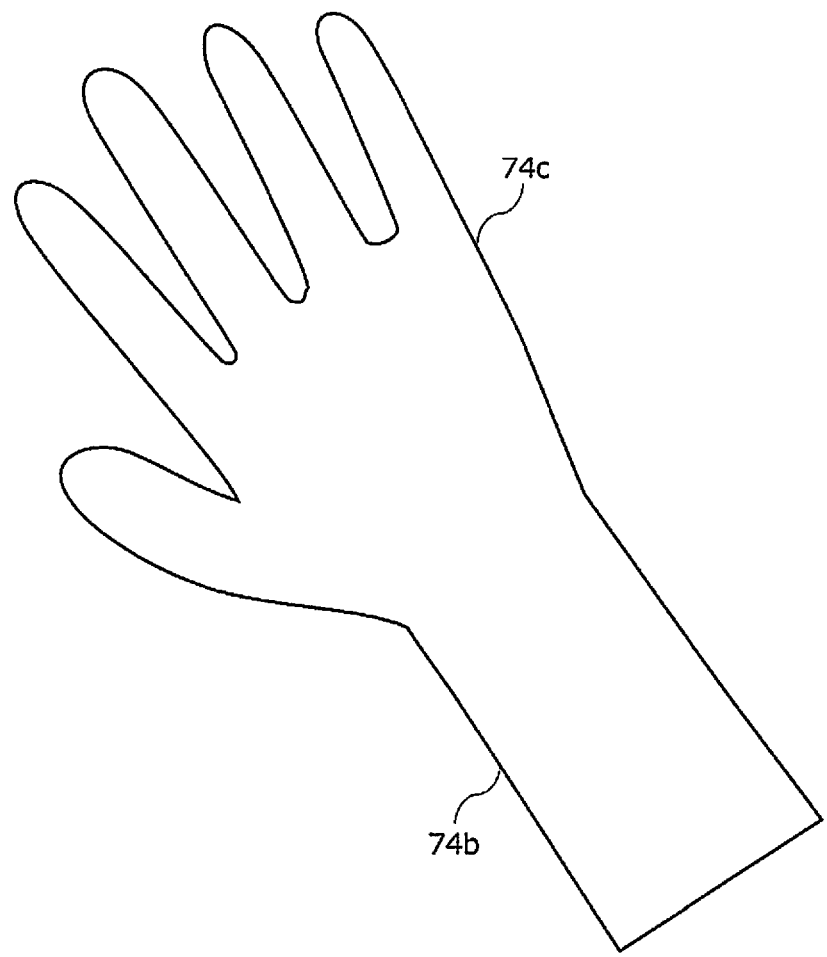
FIG. 3C is a diagram showing one example of an image of the operator that is captured by the camera in FIG. 2C.

FIG. 3C is an image captured by the camera 6 shown in FIG. 2C, the image including the right hand 74c of an operator who is a worker in a vehicle assembly factory. The camera 6 is mounted on a portion of the right-arm forearm 74b of the operator who is a worker that is near the elbow; therefore, when the right hand 74c is imaged from the camera 6, the back-of-hand side of the right-arm forearm 74b and the right hand 74c appear as shown in FIG. 3C.

In FIG. 1, the detection unit 22 has a function for detecting the orientation of the operator 7 from the image acquired by the acquisition unit 21. The orientation of the operator 7 is the posture or pose of the body of the operator 7, and specifically refers to positions of joints in the body of the operator 7 and relationships in which the joints connect to each other. For example, in cases where the positions of the joints in the body of the operator 7 and sites on the body by which joints are linked are clear, points are plotted to coordinates corresponding to the positions of the joints in a three-dimensional space defined by an orthogonal coordinate system, and the joints (points) that are linked by the sites are joined by straight lines, thereby making it possible to geometrically represent the posture of the body of the operator.

Figure 4A:
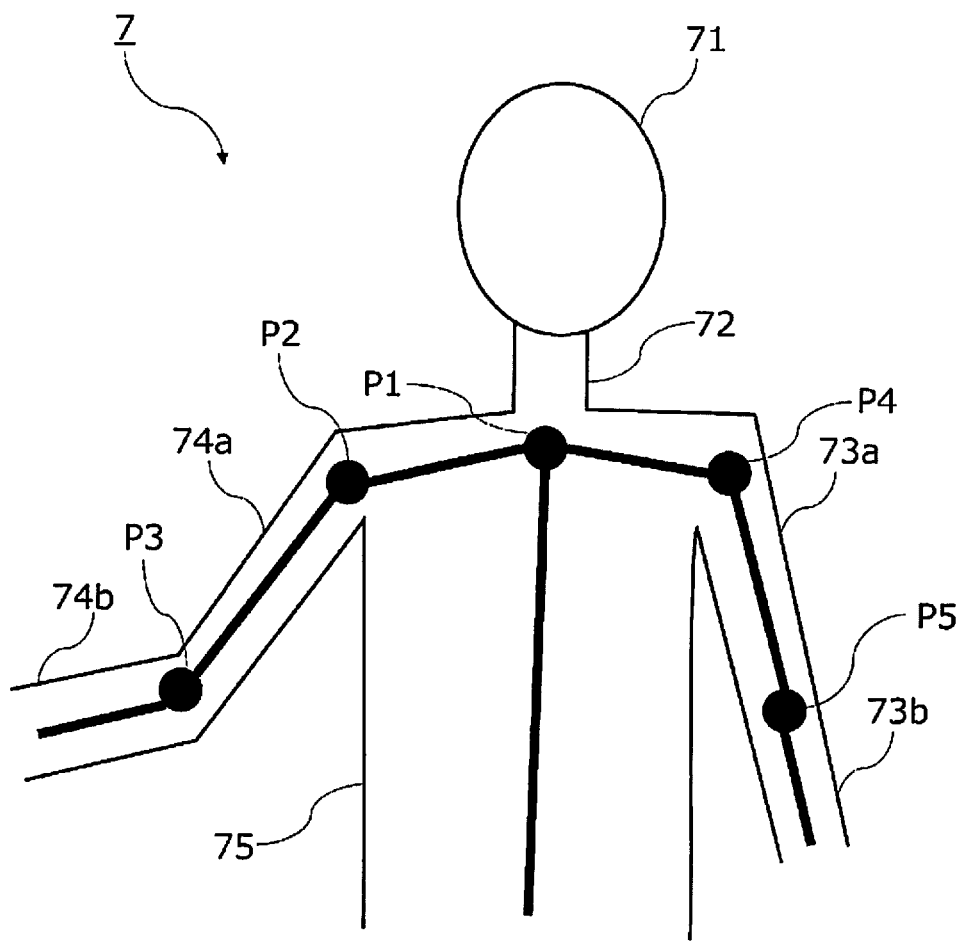
FIG. 4A is a diagram showing one example of a method for detecting an orientation of the operator shown in FIG. 3A.

As one example, when the image shown in FIG. 3A is acquired by the acquisition unit 21, the detection unit 22 performs a process such as that indicated by FIG. 4A and detects the orientation of the operator 7. In FIG. 4A, first the joints of the operator 7 included in the image are detected from within the operator 7 through pattern matching or the like. Specifically, feature portions, such as portions where the direction faced by the body of the operator 7 changes, are extracted from the inputted image data, and the extracted feature portions are compared with a class dictionary saved in a database 14, whereby an assessment is made in regard to classes to which the feature portions belong. If a class is set for each joint in the class dictionary, then an assessment can be made in regard to the joints to which the feature portions correspond.

Next, points are plotted to portions that are assessed to be joints. Specifically, as shown in FIG. 4A, a point P1 is plotted to a portion corresponding to the joint of the neck 72 of the operator 7, a point P2 is plotted to a portion corresponding to the joint of the right shoulder, a point P3 is plotted to a portion corresponding to the joint of the right elbow, a point P4 is plotted to a portion corresponding to the joint of the left shoulder, and a point P5 is plotted to a portion corresponding to the joint of the left elbow. A straight line corresponding to the right shoulder is drawn between the points P1 and P2, a straight line corresponding to the right-arm upper arm 74a is drawn between the points P2 and P3, a straight line corresponding to the left shoulder is drawn between the points P1 and P4, and a straight line corresponding to the left-arm upper arm 73a is drawn between the points P4 and P5.

The image shown in FIG. 3A does not include the right hand or the left hand of the operator 7, but because no joint is present between the elbow joint and the wrist, it is inferred that the right hand is present on an extension of the right-arm forearm 74b included in FIG. 4A and that the left hand is present on an extension of the left-arm forearm 73b included in FIG. 4A. Accordingly, as shown in FIG. 4A, a straight line is drawn from the point P3 toward the inferred position of the right hand (not shown), and a straight line is drawn from the point P5 toward the inferred position of the left hand (not shown). These straight lines pass through centers of the right-arm forearm 74b and the left-arm forearm 73b in a direction that, for example, extends straight in the length direction of the right-arm forearm 74b and the left-arm forearm 73b. Additionally, the image shown in FIG. 3A does not include a portion below the hips of the torso 75, but a straight line passing through a laterally central portion of the torso 75 is drawn from the point P1 corresponding to the joint of the neck 72, the straight line representing the position of the torso 75. Thus, the detection unit 22 represents the positions of the joints in the body of the operator 7 included in FIG. 3A using the points P1 to P5 shown in FIG. 4A and represents the relationships in which the joints connect to each other using the straight lines drawn from the points, thereby detecting the orientation of the operator 7.

Figure 4B:
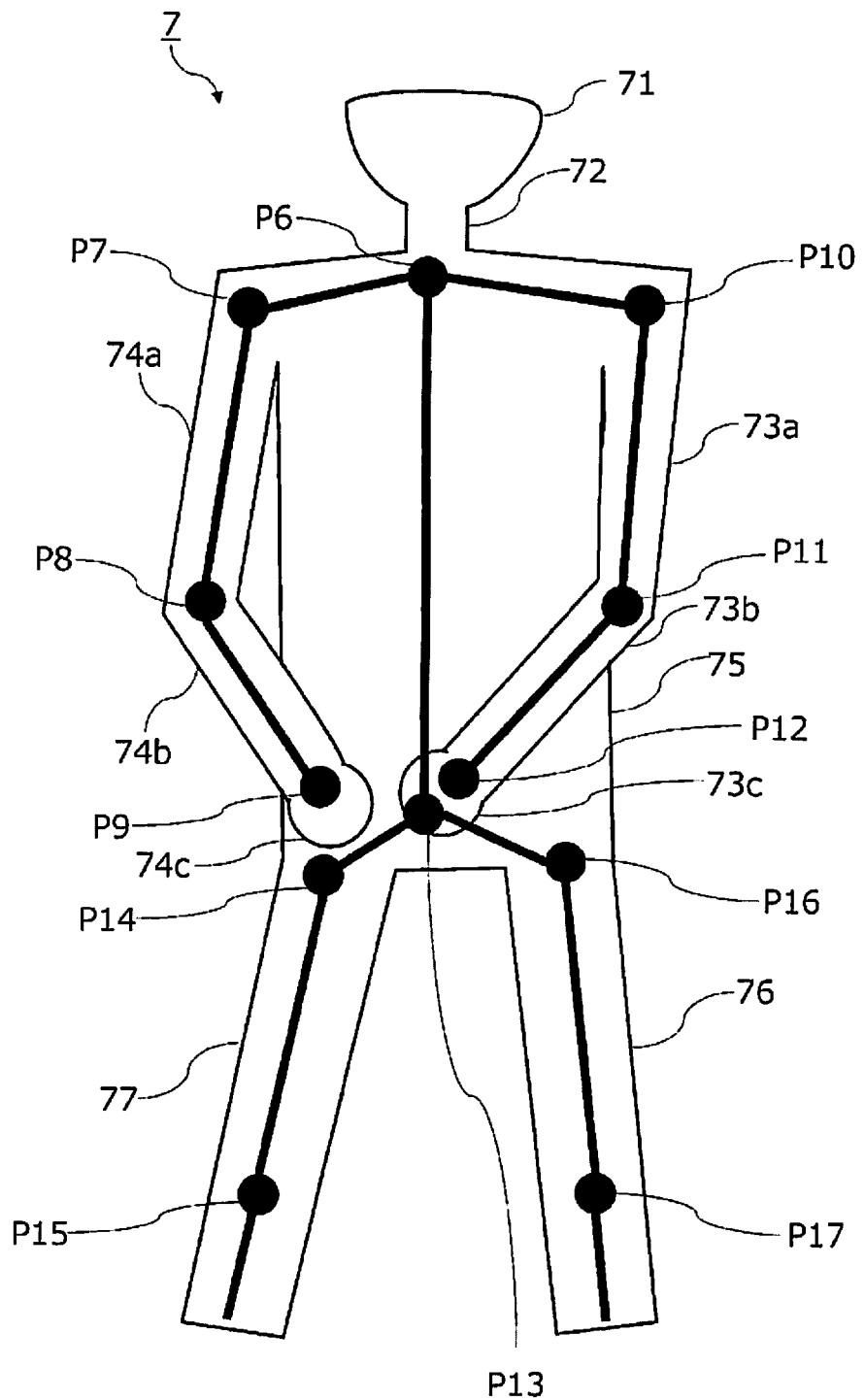
FIG. 4B is a diagram showing one example of a method for detecting the orientation of the operator shown in FIG. 3B.

As another example, when the image shown in FIG. 3B is acquired by the acquisition unit 21, the detection unit 22 performs a process such as that indicated by FIG. 4B and detects the orientation of the operator 7. In FIG. 4B, first the joints are detected through a process that is the same as the pattern matching described in regard to FIG. 4A. Next, points are plotted to the portions that are assessed to be joints, in the same manner as in the case shown in FIG. 4A. Specifically, as shown in FIG. 4B, a point P6 is plotted to a portion corresponding to the joint of the neck 72 of the operator 7, a point P7 is plotted to a portion corresponding to the joint of the right shoulder, a point P8 is plotted to a portion corresponding to the joint of the right elbow, a point P9 is plotted to a portion corresponding to the joint of the right wrist, a point P10 is plotted to a portion corresponding to the joint of the left shoulder, a point P11 is plotted to a portion corresponding to the joint of the left elbow, and a point P12 is plotted to a portion corresponding to the joint of the left wrist. Furthermore, a point P13 is plotted to a portion corresponding to the joint of the hips, a point P14 is plotted to a portion corresponding to the joint at the base of the right leg, a point P15 is plotted to a portion corresponding to the joint of the right knee, a point P16 is plotted to a portion corresponding to the joint at the base of the left leg, and a point P17 is plotted to a portion corresponding to the joint of the left knee.

Next, a straight line corresponding to the right shoulder is drawn between the points P6 and P7, a straight line corresponding to the right-arm upper arm 74a is drawn between the points P7 and P8, a straight line corresponding to the right-arm forearm 74b is drawn between the points P8 and P9, a straight line corresponding to the left shoulder is drawn between the points P7 and P10, a straight line corresponding to the left-arm upper arm 73a is drawn between the points P10 and P11, and a straight line corresponding to the left-arm forearm 75b is drawn between the points P11 and P12. Furthermore, a straight line corresponding to the torso 75 is drawn between the points P6 and P13, straight lines corresponding to the base of the hips are drawn between the points P13 and P14 and between the points P13 and P16, a straight line corresponding to the right leg 77 is drawn between the points P14 and P15, and a straight line corresponding to the left leg 76 is drawn between the points P16 and P17.

The image shown in FIG. 3B does not include the right ankle or the left ankle of the operator 7, but because no joint is present between the knee joint and the ankle, it is inferred that the right ankle is present on an extension of the right leg 77 included in FIG. 4B and that the left ankle is present on an extension of the left leg 76 included in FIG. 4B. Accordingly, as shown in FIG. 4B, straight lines are drawn from the point P15 and the point P17 toward the inferred positions of the two ankles (not shown). These straight lines pass through centers of the right leg 77 and the left leg 76 in a direction that, for example, extends straight in the length direction of the right leg 77 and the left leg 76. Thus, the detection unit 22 represents the positions of the joints in the body of the operator 7 included in FIG. 3B using the points P6 to P17 shown in FIG. 4B and represents the relationships in which the joints connect to each other using the straight lines drawn from the points, thereby detecting the orientation of the operator 7.

Figure 4C:
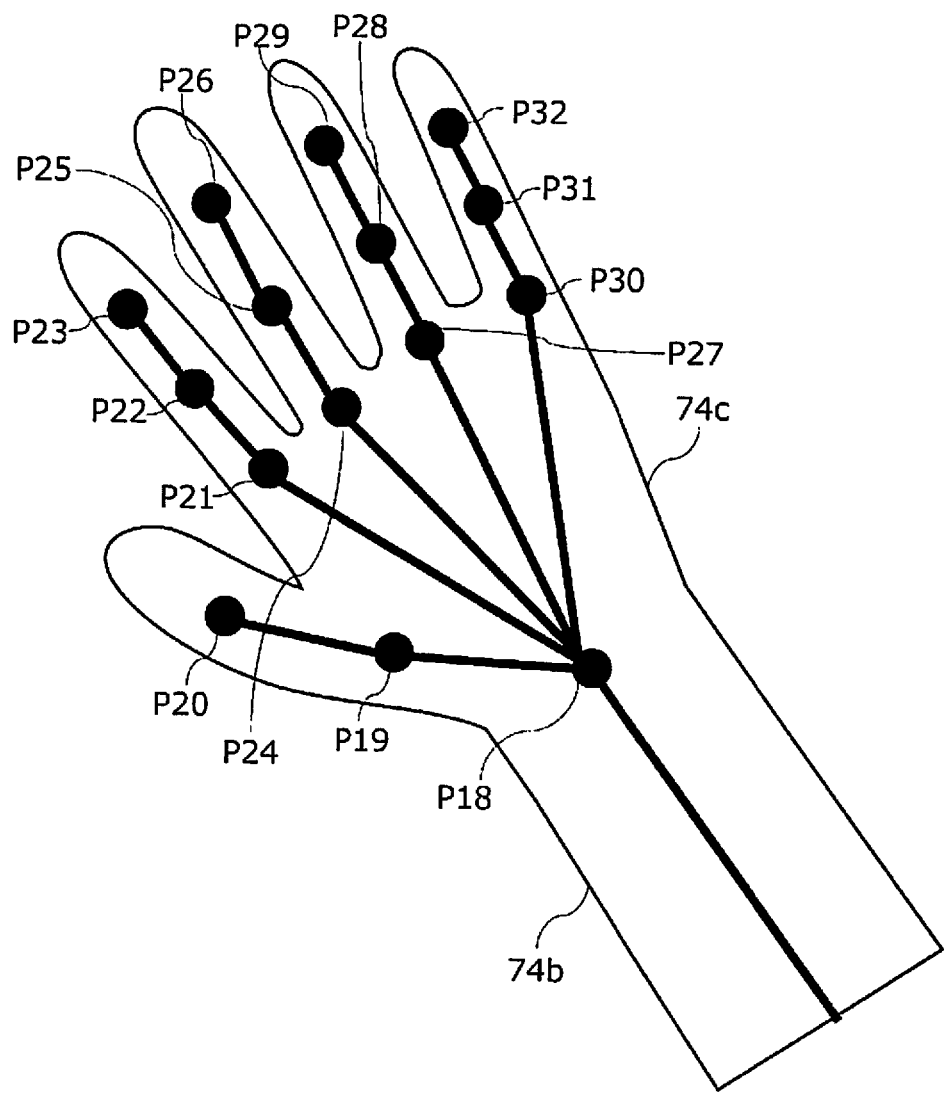
FIG. 4C is a diagram showing one example of a method for detecting the orientation of the operator shown in FIG. 3C.

As yet another example, when the image shown in FIG. 3C is acquired by the acquisition unit 21, the detection unit 22 performs a process such as that indicated by FIG. 4C and detects the orientation of the right hand 74c of the operator. In FIG. 4C, first the joints are detected through a process that is the same as the pattern matching described in regard to FIG. 4A. Next, points are plotted to the portions that are assessed to be joints, in the same manner as in the case shown in FIG. 4A. Specifically, as shown in FIG. 4C, a point P18 is plotted to a portion corresponding to the joint of the right wrist of the operator, points P19 and P20 are plotted to portions corresponding to the joints of the thumb, points P21 to P23 are plotted to portions corresponding to the joints of the pointer finger, points P24 to P26 are plotted to portions corresponding to the joints of the middle finger, points P27 to P29 are plotted to portions corresponding to the joints of the ring finger, and points P30 to P32 are plotted to portions corresponding to the joints of the pinky finger. Straight lines corresponding to the palms are next drawn between the points P18 and P19, between the points P18 and P21, between the points P18 and P24, between the points P18 and P27, and between the points P18 and P30. Furthermore, a straight line corresponding to the thumb is drawn between the points P19 and P20, straight lines corresponding to the pointer finger are drawn between the points P21 and P22 and between the points P22 and P23, straight lines corresponding to the middle finger are drawn between the points P24 and P25 and between the points P25 and P26, straight lines corresponding to the ring finger are drawn between the points P27 and P28 and between the points P28 and P29, and straight lines corresponding to the pinky finger are drawn between the points P30 and P31 and between the points P31 and P32.

The image shown in FIG. 3C does not include the right elbow of the operator, but because no joint is present between the elbow and the wrist, it is inferred that the right elbow is present on an extension of the right-arm forearm 74b included in FIG. 4C. Accordingly, as shown in FIG. 4C, a straight line is drawn from the point P18 toward the inferred position of the right elbow (not shown). This straight line passes through the center of the right-arm forearm 74b in a direction that, for example, extends straight in the length direction of the right-arm forearm 74b. Thus, the detection unit 22 represents the positions of the joints in the right hand 74c of the operator included in FIG. 3C using the points P18 to P32 shown in FIG. 4C and represents the relationships in which the joints connect to each other using the straight lines drawn from the points, thereby detecting the orientation of the right hand 74c of the operator 7.

The detection unit 22 can, in addition to the method described above, detect the orientation of the operator 7 on the basis of relative positional relationships between sites on the body of the operator 7 and objects around the operator 7. For example, the detection unit 22 calculates the locations where the head 71 and arms of the operator 7 are positioned relative to ground on which the operator 7 is standing and detects the orientation of the operator 7 on the basis of the result of the calculation. Alternatively, or in addition, the detection unit 22 can detect the orientation of the operator 7 from the direction faced by sites on the body of the operator 7. For example, the detection unit 22 detects the orientation of the operator 7 from the position of the eyes of the operator 7 (gaze), the direction faced by the hands, the direction faced by the legs, and the direction faced by the torso 75.

The joints for which points are set by the detection unit 22 are not limited to the joints shown in FIGS. 4A to 4C. Joints that are finer than those shown in FIGS. 4A and 4B may be extracted, and a greater number of points may be plotted in FIGS. 4A and 4B. For example, as shown in FIG. 4C, points may be plotted to portions corresponding to the joints of the fingers of the left hand 73c and the right hand 74c, and the form of the fingers of the left hand 73c and the right hand 74c may be detected. This makes it possible to detect fine orientations, such as whether a passenger in a vehicle is touching onboard equipment in the vehicle or whether a worker at an assembly line is gripping a tool.

When the orientation of the operator 7 is detected from an image acquired by the acquisition unit 21, the detection unit 22 may use an orientation estimation model that is trained in advance to estimate the orientation of the operator 7 from an image including the operator 7. The orientation estimation model is saved in, e.g., the database 14 shown in FIG. 1. In the orientation estimation model, the image including the operator 7 and the orientation of the operator 7 that is detected in the image are associated so as to correspond, and if given image data is inputted, then the orientation of the operator 7 that corresponds to the inputted image data is outputted. The orientation estimation model is trained through machine learning by a first machine learning unit 221 shown in FIG. 1. Specifically, the orientation estimation model is trained to detect a suitable orientation for the inputted image data using past images and results of detecting the orientation of the operator 7, which are stored in the database 14, and to output the result.

The orientation estimation model may also be a trained model that is subjected to machine learning. The trained model is trained through machine learning in advance so that suitable output data is obtained in response to given input data, the trained model being provided with at least a program that performs a computation to obtain the output data from the input data, and a weighted coefficient (parameter) that is used in the computation. The trained model causes a computer (particularly the CPU 131 that is a processor) to function such that, when the image data acquired by the acquisition unit 21 is inputted as input data, output data including the orientation of the operator 7 is outputted on the basis of the input data. Using such a trained model makes it possible to detect the orientation even for an operator 7 who performs an operation other than a learned operation.

The trained model in the present embodiment is not particularly limited and is, e.g., a neural network. The neural network is provided with an input layer, an intermediate layer, and an output layer, each of the layers including at least one neuron. The input data including the image data acquired by the acquisition unit 21 is inputted to the input layer, and the inputted data is outputted to the intermediate layer. The intermediate layer extracts data pertaining to the operator 7 from the data inputted from the input layer. The intermediate layer next detects the orientation from the extracted data pertaining to the operator 7. The output layer outputs the data inputted from the intermediate layer as output data that includes data pertaining to the orientation. The positions of the joints of the operator 7 and the relationships in which the joints connect to each other are considered as parameters in the input layer.

Figure 5A:
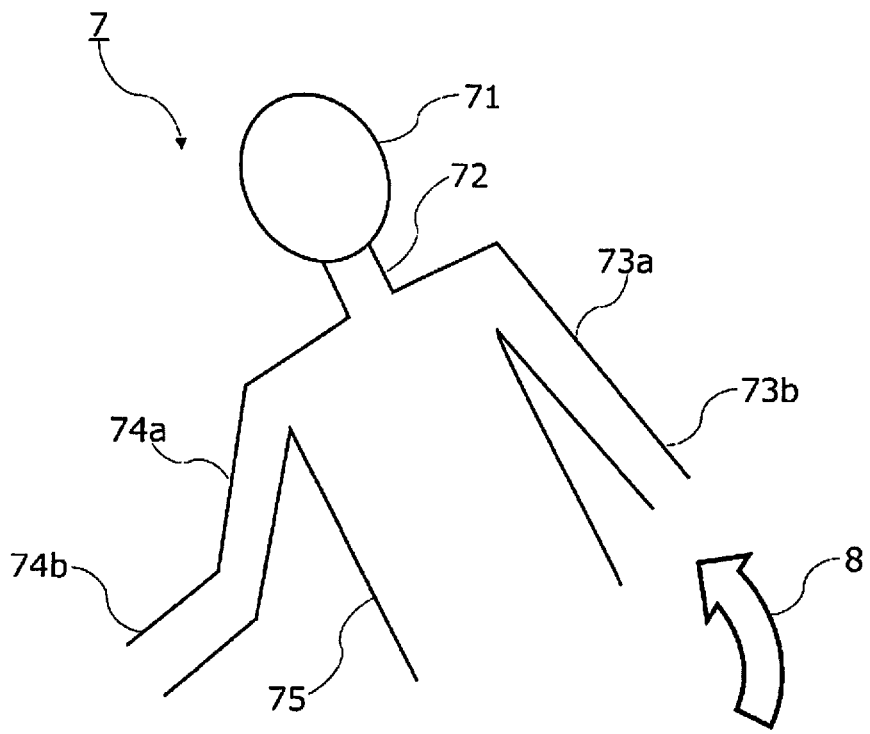
FIG. 5A is a diagram showing another example of an image of the operator that is captured by the wearable terminal in FIG. 2A.
Figure 5B:
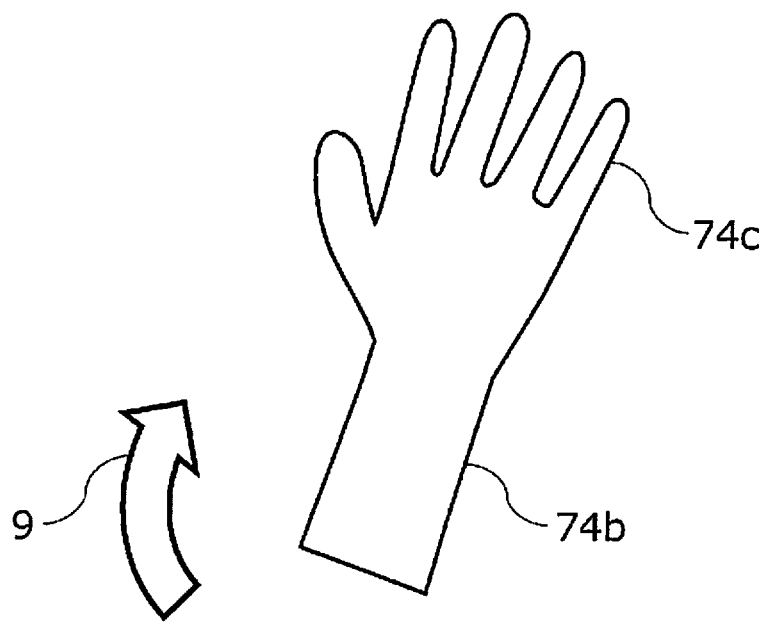
FIG. 5B is a diagram showing another example of an image of the operator that is captured by the camera in FIG. 2C.

The calculation unit 23 has a function for identifying, from the image acquired by the acquisition unit 21, a reference position that serves as a reference for positional offset calculation, and for calculating the positional offset of the imaging device 11 using the identified reference position. The imaging device 11 in the present embodiment is mounted on at least either one of the operator 7 and an article carried by the operator 7, but the mounted imaging device 11 is not limited to being completely secured, and there may be cases where the mounting position of the imaging device 11 moves, from the position where the imaging device 11 is initially mounted, while the operator 7 performs the prescribed operation. For example, in FIG. 2A, in cases where the wearable terminal 3 has rotated and moved toward the thumb of the left hand 73c due to the band 31 rotating relative to the wrist, an image in which the operator 7 has rotated counterclockwise (direction of arrow 8) as shown in FIG. 5A will be acquired by the acquisition unit 21. Additionally, in FIG. 2C, in cases where the camera 6 has rotated clockwise due to the band 61 loosening, an image in which the right hand 74c has rotated clockwise (direction of arrow 9) as shown in FIG. 5B will be acquired by the acquisition unit 21. In these cases, there is a concern that the orientation of the operator 7 will not be correctly detected by the detection unit 22, and therefore the positional offset of the mounting position of the imaging device 11 is calculated using the function of the calculation unit 23, and the orientation detected by the detection unit 22 is corrected using the function of the correction unit 24 (which shall be described later). The orientation of the operator 7 is thereby correctly detected.

The positional offset of the imaging device 11 is calculated relative to the reference position in a prescribed state. The prescribed state is, for example, an initial state in which the imaging device 11 is mounted (hereinafter referred to as an "initial state"), a state when the operator 7 starts the prescribed operation, a state that precedes a given time point (e.g., current time) by a prescribed time, or a state at a given time. The extent to which the reference position has moved (become offset) relative to the reference position in these states is calculated, and the result of calculation is regarded as the positional offset of the imaging device 11. When calculating the positional offset, the calculation unit 23 identifies a part of the body of the operator 7 that is included in the image as the reference position and calculates the positional offset using the identified part of the body.

The aforementioned part of the body is a site on the body that is identified in order to calculate the positional offset in as simple a manner as possible, the site not having a joint or other movable portion. Specifically, in cases where the imaging device 11 is mounted on the operator 7, the aforementioned part of the body is a site where no joint is present between the site and the portion where the imaging device 11 is mounted, and in cases where the imaging device 11 is mounted on an article carried by the operator 7, the aforementioned part of the body is a site where no joint is present between the site and a portion in contact with the article carried by the operator 7. No portion capable of moving due to a joint is present at the site because, in cases where the positional offset is calculated using the site as the reference position, it will be necessary to distinguish whether the site at the reference position has moved due to the joint being movable or due to the mounting position of the imaging device 11 being offset, making it difficult to accurately calculate the positional offset. No joint is present between the portion where the imaging device 11 is mounted and the portion that is in contact with the article carried by the operator 7 because, if a joint is present between the imaging device 11 and the identified site, then it will be difficult to distinguish whether movement of the site set as the reference position is caused by the joint being movable or by the mounting position being offset.

However, because the positional offset of the mounting portion of the imaging device 11 cannot be calculated using the position where the imaging device 11 is mounted, the portion on which the imaging device 11 is mounted and the portion in contact with the article carried by the operator 7, from among the sites on the body of the operator 7, are excluded from candidates for the site serving as the reference position. The portion where the imaging device 11 is mounted and the portion in contact with the article carried by the operator 7 are a subset of the sites on the body of the operator 7. Specifically, the site identified as the site serving as the reference position and the site where the imaging device 11 is mounted may be the same site. Additionally, the site identified as the site serving as the reference position and the site in contact with the article carried by the operator 7 may be the same site.

When the site serving as the reference position is detected, a site that is set in advance is detected through pattern matching from, e.g., the body of the operator 7 included in the image data. When the site set in advance is identified, the site is set as the reference position for calculating the positional offset. As one example, in cases where the wearable terminal 3 is mounted on the wrist of the left hand 73c as shown in FIG. 2A, the left-arm forearm 73b present between the wrist and the left elbow joint is set in advance as the site serving as the reference position. The left-arm forearm 73b does not have a portion that is movable due to a joint, and no joint is present between mounted wearable terminal 3 and the left-arm forearm 73b. By contrast, because the left hand 73c is provided with finger joints, the left hand 73c cannot be the reference position for calculating positional offset. As another example, in cases where the helmet 5 is mounted on the head 71 as shown in FIG. 2B, the nose, which is not covered by the helmet 5, is set in advance as the site serving as the reference position. The nose does not have a portion that is movable due to a joint, and no joint is present between the nose and the portion covered by the helmet 5. By contrast, because the lower jaw moves due to the jaw joint, the jaw and mouth cannot be the reference position for calculating the positional offset. As yet another example, in cases where the camera 6 is mounted on a portion of the right-arm forearm 74b that is near the elbow as shown in FIG. 2C, the right-arm forearm 74b is set in advance as the site serving as the reference position. The right-arm forearm 74b does not have a portion that is movable due to a joint, and no joint is present between the mounted camera 6 and the right-arm forearm 74b (particularly the wrist side of the right-arm forearm 74b). By contrast, because the right hand 74c moves due to the wrist joint, the right hand 74c cannot be the reference position for calculating the positional offset.

Figure 6A:
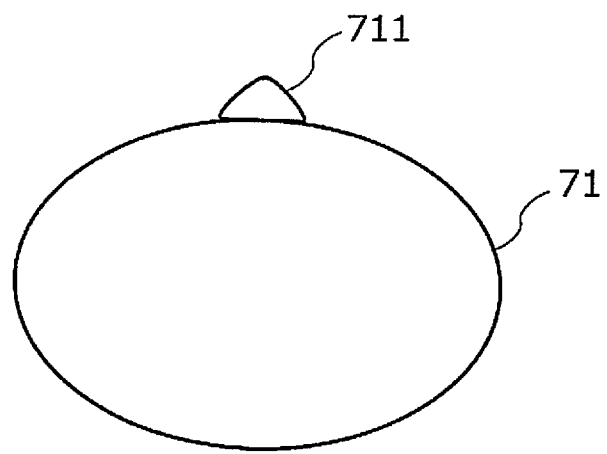
FIG. 6A is a diagram showing another example of an image of the operator that is captured by the camera in FIG. 2B (part 1).
Figure 6B:
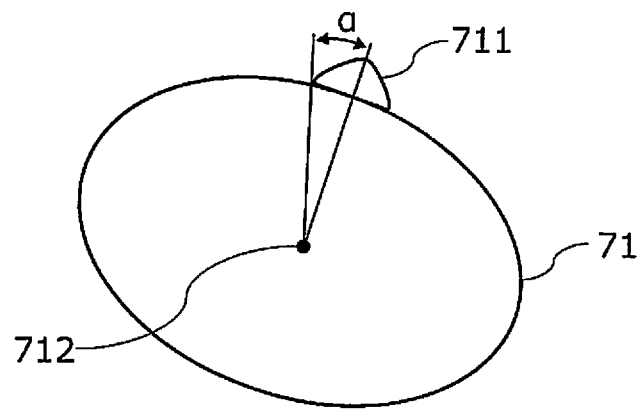
FIG. 6B is a diagram showing another example of an image of the operator that is captured by the camera in FIG. 2B (part 2).

As one example, FIGS. 6A and 6B show methods for calculating the positional offset in cases where the nose is identified as the reference position for calculating the positional offset and the identified nose is set as the reference position. FIG. 6A is a plan view showing one example of an image acquired when the head 71 is imaged using the camera 6 shown in FIG. 2B. The head 71 and the nose 711 are included in FIG. 6A, the nose 711 being set as the reference position for calculating the positional offset. The positional offset in the case shown in FIG. 6A is calculated with respect to a position when the imaging device 11 is initially mounted, i.e., the initial-state position shown in FIG. 6A. In such cases, when the helmet 5 has rotated counterclockwise, the reference position is compared with the position of the imaging device 11 when the helmet 5 was initially put on, as shown in FIG. 6B, and it is apparent that the head 71 has rotated clockwise by an angle a relative to the center 712 of the head 71 in the case where the operator 7 is seen in plan view. However, if the helmet 5 is properly mounted on the operator 7, then the position of the nose 711 in the image will not change even if the operator 7 rotates. In practice, the operator 7 has not rotated, and only the helmet 5 has rotated. In cases where an image is acquired in which the nose, which is the reference position, has moved relative to the position where the imaging device 11 was initially mounted, which is the initial state, as shown in FIG. 6B, the calculation unit 23 detects a distance and an angle (angle a in the case shown in FIG. 6B) by which the nose has moved relative to the position of the nose 711 in the initial state (i.e., the position of the center 712). The positional offset caused by the rotation of the helmet 5 (camera 6) is next calculated from the detected distance and angle. Information pertaining to the calculated positional offset is then outputted to the correction unit 24. The mounting position of the imaging device 11 in the initial state or the position of the nose 711 in the initial state is referred to as a reckoning position for calculating the positional offset.

The site serving as the reference position may also be identified from time-series images acquired by the acquisition unit 21 rather than being set in advance. For example, in time-series images captured within a prescribed period, a site that is moved by only a distance within a prescribed range in which positional offset of the mounting position of the imaging device 11 can be detected (e.g., a range of 5 mm or less) is detected, and the aforementioned site is identified as the reference position. For example, in cases where the imaging device 11 is mounted facing upward on the ankle of the right leg, a site for which the movement amount in time-series images captured within a period of one minute is 5 mm or less is detected in the time-series images. In such cases, because the operator 7 is imaged upward from the ankle of the right leg, the calf of the right leg substantially does not move relative to the ankle. Therefore, the calf of the right leg is identified as the reference position.

Furthermore, when the acquisition unit 21 acquires time-series images that include the site serving as the reference position, the calculation unit 23 calculates the positional offset from the amount of movement of the site in the time-series images. For example, it is possible to acquire movement of the nose 711 shown in FIGS. 6A and 6B in the form of time-series images from when the helmet 5 is mounted to when the helmet 5 has rotated as shown in FIG. 6B, to calculate the extent to which the nose 711 has moved and the direction in which the nose 711 has moved since the helmet 5 was mounted, and to employ the result of calculation as the positional offset. In such cases, the reckoning position for calculating the positional offset may be set to the initial position of the site in the time-series images.

When the positional offset is calculated from the images acquired by the acquisition unit 21, the calculation unit 23 may use a positional offset estimation model that is trained in advance to estimate the positional offset from the position of the site set as the reference position in the images. The positional offset estimation model is saved in, e.g., the database 14 shown in FIG. 1. In the positional offset estimation model, the image including the operator 7 and the positional offset that is calculated for the image are associated so as to correspond, and if given image data is inputted, then the positional offset that corresponds to the inputted image data is outputted. The positional offset estimation model is trained through machine learning by a second machine learning unit 231 shown in FIG. 1. Specifically, the positional offset estimation model is trained to estimate a suitable positional offset for the inputted image data using past images and results of calculating the positional offset, which are stored in the database 14, and to output the result.

The positional offset estimation model may also be a trained model that is subjected to machine learning. The trained model causes a computer (particularly the CPU 131 that is a processor) to function such that, when the image data acquired by the acquisition unit 21 is inputted as input data, output data including the positional offset is outputted on the basis of the input data. Using such a trained model makes it possible to calculate the positional offset even for an operator 7 who performs an operation other than a learned operation.

The trained model in the present embodiment is not particularly limited and is, e.g., a neural network. The neural network is provided with an input layer, an intermediate layer, and an output layer, each of the layers including at least one neuron. The input data including the image data acquired by the acquisition unit 21 is inputted to the input layer, and the inputted data is outputted to the intermediate layer. The intermediate layer extracts data pertaining to the operator 7 from the data inputted from the input layer. The intermediate layer next estimates the positional offset from the extracted data pertaining to the operator 7. The output layer outputs the data inputted from the intermediate layer as output data that includes data pertaining to the positional offset. The positions of the joints of the operator 7 and the relationships in which the joints connect to each other are considered as parameters in the input layer.

In cases where an image including a pattern for specifying the position of the imaging device 11 is acquired by the acquisition unit 21, the calculation unit 23 may identify the pattern as the reference position and calculate the positional offset using the position of the imaging device 11 as specified by the pattern. The pattern is not particularly limited, provided that the pattern serves as a reference when the positional offset in the image is calculated; examples of the pattern include a plurality of intersecting lines, star-shaped marks, and the like. For example, a pattern of grid lines is applied to a mask mounted on the passenger of the vehicle, and the positional offset of the mounting position of the imaging device 11 is calculated using the grid lines. Furthermore, in cases where the position of the imaging device 11 and the orientation of the operator 7 are detected by the detection unit 22 using a detection device installed in the surroundings of the operator 7, the calculation unit 23 may calculate the positional offset on the basis of the position of the imaging device 11 and the orientation of the operator 7 that were detected by the detection unit 22. For example, the position of the imaging device 11 and the orientation of the operator 7 are detected using a camera installed in front of a worker at an assembly line, and the action of the operator 7 is estimated using the result of detection.

The correction unit 24 has a function for correcting the orientation detected by the detection unit 22 using the positional offset of the imaging device 11 that was calculated by the calculation unit 23. The correction unit 24 geometrically transforms the orientation of the operator 7, said orientation having been acquired by the detection unit 22 and geometrically represented, using information pertaining to the positional offset calculated by the calculation unit 23. For example, in cases where the helmet 5 has rotated counterclockwise by the angle a as shown in FIG. 6B, the detected orientation is subjected to a transformation that involves rotating the helmet 5 clockwise by the angle a. This makes it possible to detect the orientation of the operator 7 from before the helmet 5 rotated and the mounting position became offset, i.e., the accurate orientation of the operator 7. Additionally, in cases where the helmet 5 is offset longitudinally or laterally relative to the operator 7, the detected orientation is subjected to at least one linear transformation from among translation, rotation, scaling up, and scaling down, and movement (i.e., positional offset) of the helmet 5 is corrected. With respect to the wearable terminal 3 shown in FIG. 2A and the camera 6 shown in FIG. 2C as well, it is possible to perform similar geometric transformation and correct the positional offset.

The estimation unit 25 has a function for estimating the action of the operator 7 from the orientation of the operator 7 that has been corrected by the correction unit 24. The action of the operator refers to all actions that are necessary in order to complete the prescribed operation. In addition to the actions in which a vehicle passenger reaches out a hand to a switch on an air conditioner or other onboard equipment in order to operate the onboard equipment, actions in which a worker in an assembly factory retrieves a torque wrench from a toolbox, and actions in which a mechanic at a dealer touches a switch for raising or lowering a lift on which a vehicle is elevated, examples of the action of the operator also include actions in which a vehicle passenger presses a switch for raising or lowering the window of the vehicle, actions in which a vehicle passenger touches a touch panel to change the display of a map on a navigation device, actions in which a worker in an assembly factory fits together a coupler that is connected to a sensor and a coupler that is connected to an electronic control device (ECU), actions in which a worker in an assembly factory fastens a bolt using a tool and attaches an exhaust manifold to an engine block, actions in which a mechanic at a dealer fits a spark plug into an engine, and actions in which a mechanic at a dealer fastens a bolt using a torque wrench.

For example, in cases where the orientation shown in FIG. 4A is detected, the estimation unit 25 estimates, from the positions of the points P1 to P3 shown in FIG. 4A as well as the shapes of the straight lines drawn between the points P1 to P3, that the operator 7, who is a passenger in a vehicle, extended the right hand (not shown) to an operation part on onboard equipment with intent to operate the onboard equipment. In cases where the orientation shown in FIG. 4B is detected, the estimation unit 25 estimates, from the positions of the points P7 to P9 and the points P10 to P12 shown in FIG. 4B as well as the shapes of the straight lines drawn between the points P7 to P9 and between the points P10 to P12, that the operator 7, who is a worker in an assembly factory, attempted to grab a tool that is used in assembly by using the left hand 73c and the right hand 74c with intent to operate the tool. In cases where the orientation shown in FIG. 4C is detected, the estimation unit 25 estimates, from the positions of the points P19 to P32 shown in FIG. 4C as well as the shapes of the straight lines drawn between the points P19 to P32, that the operator 7, who is a mechanic at a dealer, reached out fingers and attempted to grab a tool that is used in assembly by using the right hand 74c. Such actions are estimated using, e.g., pattern matching. Specifically, feature portions pertaining to the positions of the joints of the operator 7, the relationships in which the joints connect to each other, the shapes of the sites on the body where the joints connect, and other features are extracted from the inputted data pertaining to the orientation, and the extracted feature portions are compared with a class dictionary saved in the database 14, whereby an assessment is made in regard to classes to which the feature portions belong. If actions corresponding to orientations are set as classes in the class dictionary, then the action can be estimated from the orientation.

When estimating the action, the estimation unit 25 can use an action estimation model that is trained in advance to estimate the action of the operator 7 from the orientation of the operator 7, said orientation having been detected by the detection unit 22 and corrected by the correction unit 24. The action estimation model is saved in, e.g., the database 14 shown in FIG. 1. In the action estimation model, the detected orientation of the operator 7 and the action of the operator 7 are associated so as to correspond, and if given orientation data is inputted, then the action of the operator 7 that corresponds to the inputted orientation data is outputted. The action estimation model is trained through machine learning by a third machine learning unit 251 shown in FIG. 1. Specifically, the action estimation model is trained to estimate a suitable action for the inputted orientation data using past results of detecting the orientation of the operator 7 and estimated actions of the operator 7, which are stored in the database 14, and to output the result.

The action estimation model may also be a trained model that is subjected to machine learning. The trained model causes a computer (particularly the CPU 131 that is a processor) to function such that, when the orientation data detected by the detection unit 22 is inputted as input data, output data including the action of the operator 7 is outputted on the basis of the input data. Using such a trained model makes it possible to suitably detect the action even for an operator 7 who performs an operation other than a learned operation. The inputted orientation data may be corrected or not corrected by the calculation unit 24.

The trained model in the present embodiment is not particularly limited and is, e.g., a neural network. The neural network is provided with an input layer, an intermediate layer, and an output layer, each of the layers including at least one neuron. The input data including the orientation data detected by the detection unit 22 is inputted to the input layer, and the inputted data is outputted to the intermediate layer. The intermediate layer extracts data pertaining to the orientation of the operator 7 from the data inputted from the input layer. The intermediate layer next estimates the action from the extracted data pertaining to the orientation of the operator 7. The output layer outputs the data inputted from the intermediate layer as output data that includes data pertaining to the action. The positions of the points indicating the joints of the operator 7 and the shapes of the straight lines indicating the relationships in which the joints connect to each other are considered as parameters in the input layer.

There may be cases where a plurality of actions are estimated for the orientation of the operator 7, but because the operator 7 in the present embodiment performs a prescribed operation, the estimation unit 25 can specify an action corresponding to the orientation if attributes of the operator 7 are specified. The attributes of the operator 7 are features pertaining to the role of the operator 7 and the location where the operator 7 is present, such as whether the operator 7 is a vehicle passenger, a worker working at an assembly line in an assembly factor, or a mechanic at a repair shop of a vehicle dealer.

The output unit 26 has a function for outputting the action estimated by the estimation unit 25 to the display device 12. The action of the operator 7 that is outputted from the output unit 26 is received by the display device 12. The action of the operator is displayed on the display device 12 and presented to the operator 7 and a supervisor of the operator 7, or other such personnel. The operator 7 and the supervisor recognize the action presented by the display device 12, thereby making it possible to recognize whether the action of the operator 7 is necessary for the prescribed operation, whether the operator 7 performs the prescribed operation in a prescribed procedure, whether the operator 7 deviates from a necessary procedure, and the like. The assessment as to whether the action of the operator 7 is necessary for the prescribed operation, whether the operator 7 performs the prescribed operation in a prescribed procedure, whether the operator 7 deviates from a necessary procedure, and the like may also be performed by the processing unit 2 instead of the operator 7 and the supervisor. In such cases, the prescribed operation, the procedure of the prescribed operation, the actions that are necessary for the prescribed operation, and other information is saved in the database 14 and is acquired by the processing unit 2 as necessary.

Figure 7:
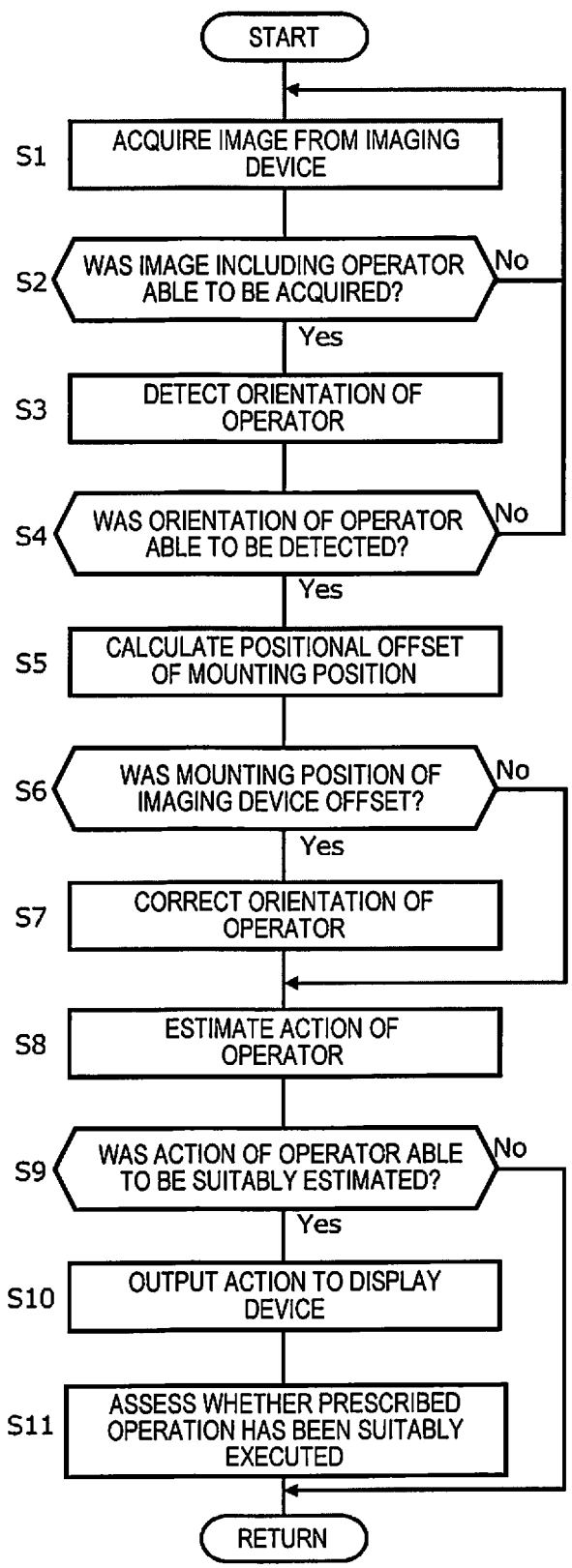
FIG. 7 is a flow chart showing one example of a procedure pertaining to information processing in the image processing system in FIG. 1.

A procedure used when the image processing device 13 processes information shall be described with reference to FIG. 7. FIG. 7 is one example of a flow chart showing information processing in the image processing system 1 of the present embodiment. The process described below is executed at prescribed temporal intervals by the CPU 131, which is the processor of the image processing device 13, while the operator 7 performs the prescribed operation.

First, in step S1, the image data captured by the imaging device 11 is acquired through the function of the acquisition unit 21. Next, in step S2, an assessment is made as to whether image data including the operator 7 has been acquired. If the operator 7 is not included in the acquired image data, then the procedure returns to step S1. However, if the operator 7 is included in the acquired image data, then the procedure advances to step S3.

In step S3, the orientation of the operator 7 included in the image is detected through the function of the detection unit 22. Next, in step S4, an assessment is made as to whether the orientation of the operator 7 was able to be suitably detected. If the orientation of the operator 7 was not able to be suitably detected, then the procedure returns to step S1. However, if the orientation of the operator 7 was able to be suitably detected, then the procedure advances to step S5.

In step S5, the extent to which the mounting position of the imaging device 11 is offset relative to, e.g., the reference position in the initial state is calculated through the function of the calculation unit 23. Next, in step S6, an assessment is made as to whether the mounting position of the imaging device 11 is offset. Specifically, an assessment is made as to whether the calculated amount of positional offset is within a range in which the orientation of the operator 7 can be correctly detected. If the calculated amount of positional offset is within the range in which the orientation of the operator 7 can be correctly detected, then the procedure advances to step S8. However, if the calculated amount of positional offset exceeds the range in which the orientation of the operator 7 can be correctly detected, then the procedure advances to step S7.

In step S7, the orientation of the operator 7 is corrected, on the basis of the amount of offset calculated by the calculation unit 23, through the function of the correction unit 24. Next, in step S8, the action of the operator 7 is estimated, from the orientation of the operator 7, through the function of the estimation unit 25. Next, in step S9, an assessment is made as to whether the action of the operator 7 was able to be suitably estimated. If the action of the operator 7 was not able to be suitably estimated, then execution of the routine is stopped, and the information processing is ended. However, if the action of the operator 7 was able to be suitably estimated, then the procedure advances to step S10.

In step S10, the data including the estimated action is outputted from the image processing device 13 to the display device 12 through the function of the output unit 26. Next, in step S11, an assessment as to whether the operator 7 is suitably executing the prescribed operation is made, on the basis of the action estimated by the estimation unit 25, through the function of the processing unit 2. At this time, the result of the assessment may be outputted to the display device 12. If the process in step S11 is complete, then execution of the routine is stopped, and the information processing is ended. Steps S2, S4, S6, and S9 to S11 are not essential steps and can be provided as necessary.

The present embodiment as described above provides the image processing device 13 provided with: the acquisition unit 21 that acquires the image including the operator 7 who is performing the prescribed operation from the imaging device 11 mounted on at least either one of the operator 7 and the article carried by the operator 7; the detection unit 22 that detects the orientation of the operator 7 from the image; the calculation unit 23 that calculates the positional offset of the imaging device 11, from the image, using the reference position that serves as a reference for calculating the positional offset; and the correction unit 24 that corrects the orientation using the positional offset. This makes it possible to correctly recognize the orientation of the operator 7 even if the mounting position of the imaging device 11 (e.g., camera) is offset.

The image processing device 13 in the present embodiment is also provided with the estimation unit 25 that estimates the action of the operator 7 from the corrected orientation using the action estimation model that is trained in advance to estimate the orientation of the operator 7 from the orientation. This makes it possible to associate the orientation and the action of the operator 7 and estimate the action of the operator 7.

In the image processing device 13 in the present embodiment, the detection unit 22 detects the orientation of the operator 7 from the image using the orientation estimation model that is trained in advance to estimate the orientation of the operator 7 from the image. This makes it possible to precisely detect the orientation using the preceding result of detection.

In the image processing device 13 in the present embodiment, the calculation unit 23 identifies part of the body of the operator 7 that is included in the image as the reference position and calculates the positional offset relative to the reference position in the prescribed state. This makes it possible to easily realize accurate calculation of the positional offset using the site on the body.

In the image processing device 13 in the present embodiment: if the imaging device 11 is mounted on the operator, then the reference position is a site on the body of the operator 7 where no portion that is capable of moving due to a joint at the site is present, and where no joint is present between the site and the portion where the imaging device 11 is mounted, among sites on the body of the operator 7 other than the portion where the imaging device 11 is mounted; and if the imaging device 11 is mounted on the article, then the reference position is a site on the body of the operator 7 where no portion that is capable of moving due to a joint at the site is present, and where no joint is present between the site and a portion in contact with the article carried by the operator 7, among sites on the body of the operator 7 other than the portion in contact with the article. This makes it possible to more accurately specify the site on the body.

In the image processing device 13 in the present embodiment, the acquisition unit 21 acquires time-series images that include the reference position, and the calculation unit 23 calculates the positional offset using the amount of movement of the reference position in the time-series images. This makes it possible to more accurately calculate the positional offset of the imaging device 11.

In the image processing device 13 in the present embodiment, the calculation unit 23 calculates the positional offset using the positional offset estimation model that is trained in advance to estimate the positional offset from the position of the reference position in the images. This makes it possible to calculate the amount of positional offset merely by inputting the image.

In the image processing device 13 in the present embodiment, the acquisition unit 21 acquires an image including a pattern for specifying the position of the imaging device 11, and the calculation unit 23 identifies the pattern as the reference position and calculates the positional offset using the position of the imaging device 11 as specified from the pattern. This makes it possible to more accurately calculate the positional offset of the imaging device 11.

In the image processing device 13 in the present embodiment: the detection unit 22 detects the position of the imaging device 11, and the orientation of the operator 7, using the detection device installed in the surroundings of the operator 7; and the calculation unit 23 calculates the positional offset on the basis of the position of the imaging device 11 and the orientation of the operator 7 that were detected by the detection unit 22. This makes it possible to more accurately calculate the positional offset of the imaging device 11.

The present embodiment also provides an image processing method executed by the processor, wherein the processor: acquires the image including the operator 7 who is performing the prescribed operation from the imaging device 11 mounted on at least either one of the operator 7 or the article carried by the operator 7; detects the orientation of the operator 7 from the image; calculates the positional offset of the imaging device 11, from the image, using a reference position that serves as a reference for calculating the positional offset; and corrects the orientation using the positional offset. This makes it possible to correctly recognize the orientation of the operator 7 even if the mounting position of the imaging device 11 (e.g., camera) is offset.

The invention claimed is:

1. An image processing device comprising:
a processor including
an acquisition unit configured to electronically acquire an image including a person from an imaging device mounted on at least either one of the person or an article carried by the person, the imaging device including a camera;
a detection unit configured to detect an orientation of the person from the image;
a calculation unit configured to identify a part of a body of the person included in the image as a reference position and to calculate a positional offset of the imaging device from the image using the reference position in a prescribed state that serves as a reference for calculating the positional offset relative to the reference position in the prescribed state, the positional offset being calculated based on an amount of movement of the part of the body relative to the reference position, the positional offset being indicative of movement of the imaging device relative to an initial position of the imaging device;
a correction unit configured to correct the orientation of the person detected by the detection unit using the positional offset to provide a corrected orientation of the person in the image in real time; and
an estimation unit configured to estimate an action of the person from the corrected orientation using an action estimation model that is trained in advance to estimate the action of the person from the orientation.

2. The image processing device according to claim 1, wherein
the detection unit is configured to detect the orientation of the person from the image using an orientation estimation model that is trained in advance to estimate the orientation of the person from the image.

3. The image processing device according to claim 1, wherein
where the imaging device is mounted on the person, the reference position is a site on the body of the person that is not movable due to a joint being present at the site, and that no joint is present between the site and the portion where the imaging device is mounted, among sites on the body of the person other than the portion where the imaging device is mounted; and
where the imaging device is mounted on the article, the reference position is a site on the body of the person that is not movable due to a joint being present at the site, and that no joint is present between the site and a portion in contact with the article carried by the person among sites on the body of the person other than the portion in contact with the article.

4. The image processing device according to claim 1, wherein
the acquisition unit is configured to acquire time-series images that include the reference position, and
the calculation unit is configured to calculate the positional offset using a movement amount of the reference position in the time-series images.

5. The image processing device according to claim 1, wherein
the calculation unit is configured to calculate the positional offset using a positional offset estimation model that is trained in advance to estimate the positional offset from the position of the reference position in the images.

6. The image processing device according to claim 1, wherein
the acquisition unit is configured to an image including a pattern for specifying the position of the imaging device, and
the calculation unit is configured to identify the pattern as the reference position, and is configured to calculate the positional offset using the position of the imaging device as specified from the pattern.

7. The image processing device according to claim 1, wherein
the detection unit is configured to detect the position of the imaging device and the orientation of the person using a detection device installed in around the person; and the calculation unit is configured to calculate the positional offset based on the position of the imaging device and the orientation of the person that were detected by the detection unit.

8. An image processing method executed by a processor, comprising:

the processor
- electronically acquiring an image including a person from an imaging device mounted on at least either one of the person or an article carried by the person, the imaging device including a camera;
- detecting an orientation of the person from the image;
- identifying a part of a body of the person included in the image as a reference position in a prescribed state;
- calculating a positional offset of the imaging device from the image using the reference position in the prescribed state that serves as a reference for calculating the positional offset, the positional offset being calculated based on an amount of movement of the part of the body relative to the reference position, the positional offset being indicative of movement of the imaging device relative to an initial position of the imaging device;
- correcting the orientation of the person detected by the detection unit using the positional offset to provide a corrected orientation of the person in the image in real time; and
- estimating an action of the person from the corrected orientation using an action estimation model that is trained in advance to estimate the action of the person from the orientation.

* * * * *